United States Patent
Shimizu et al.

(10) Patent No.: US 10,202,138 B2
(45) Date of Patent: Feb. 12, 2019

(54) VEHICLE STEERING WHEEL

(71) Applicant: HONDA MOTOR CO., LTD., Tokyo (JP)

(72) Inventors: Taro Shimizu, Wako (JP); Tadashi Inazu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/629,063

(22) Filed: Jun. 21, 2017

(65) Prior Publication Data

US 2017/0369090 A1    Dec. 28, 2017

(30) Foreign Application Priority Data

Jun. 23, 2016 (JP) .................. 2016-124334

(51) Int. Cl.
*B62D 1/10* (2006.01)
*B62D 1/08* (2006.01)
*B62D 1/11* (2006.01)
*B29L 31/30* (2006.01)
*B62D 1/04* (2006.01)

(52) U.S. Cl.
CPC .................. *B62D 1/10* (2013.01); *B62D 1/08* (2013.01); *B62D 1/11* (2013.01); *B29L 2031/3047* (2013.01); *B62D 1/04* (2013.01)

(58) Field of Classification Search
CPC .... B62D 1/10; B62D 1/08; B62D 1/04; B29L 2031/3047; Y10T 74/20834
See application file for complete search history.

(56) References Cited

U.S. PATENT DOCUMENTS

| | | | | |
|---|---|---|---|---|
| 1,276,797 A * | 8/1918 | Newton | .................... | B62D 1/10 74/555 |
| 1,661,481 A * | 3/1928 | Kenrick | ................... | B62D 1/08 74/552 |
| 2,017,681 A * | 10/1935 | Burgess | .................... | B62D 1/08 74/552 |
| 2,128,069 A * | 8/1938 | Ashby | ...................... | B62D 1/08 74/552 |
| 2,152,370 A * | 3/1939 | Woollard | ................. | B62D 1/08 74/552 |
| 2,156,476 A * | 5/1939 | Husted | ..................... | B62D 1/08 74/47 |
| 2,197,317 A * | 4/1940 | Ratner | ..................... | B62D 1/08 74/552 |

(Continued)

FOREIGN PATENT DOCUMENTS

| | | |
|---|---|---|
| JP | 2001-171526 A | 6/2001 |
| JP | 2014-094727 A | 5/2014 |

*Primary Examiner* — Paul N Dickson
*Assistant Examiner* — Timothy Wilhelm
(74) *Attorney, Agent, or Firm* — Rankin, Hill & Clark LLP

(57) ABSTRACT

In order for a core metal member having three spoke parts to be usable in a three-spoke steering wheel and a two-spoke steering wheel having one fewer spoke part than the three-spoke steering wheel, one of the spoke parts of the core metal member is a separable spoke part, which is separable along separation marks provided on vertical spokes forming the separable spoke part. Each vertical spoke constituting the separable spoke part is provided with an indented first fragile portion and an indented second fragile portion which also act as the separation marks.

6 Claims, 4 Drawing Sheets

(56) References Cited

U.S. PATENT DOCUMENTS

| | | | | |
|---|---|---|---|---|
| 2,203,791 A * | 6/1940 | Lange | B62D 1/08 | 74/552 |
| 2,236,674 A * | 4/1941 | Davy | B62D 1/08 | 74/552 |
| 2,564,905 A * | 8/1951 | Kaye | B62D 1/10 | 152/40 |
| 2,683,383 A * | 7/1954 | Schmid | B62D 1/11 | 74/552 |
| 3,893,349 A * | 7/1975 | Stent | B62D 1/08 | 74/552 |
| 4,044,624 A * | 8/1977 | Dekker | B62D 1/08 | 74/552 |
| 4,709,944 A * | 12/1987 | Hongo | B62D 1/08 | 280/750 |
| 4,946,194 A * | 8/1990 | Maeda | B60R 21/05 | 280/750 |
| 5,060,535 A * | 10/1991 | Fujita | B60Q 5/003 | 29/894.1 |
| 5,090,731 A * | 2/1992 | Fujita | B62D 1/04 | 280/777 |
| 5,244,230 A * | 9/1993 | Komiya | B62D 1/11 | 280/750 |
| 5,868,041 A * | 2/1999 | Suzuki | B62D 1/11 | 74/552 |
| 5,896,661 A * | 4/1999 | Worrell | B62D 1/04 | 29/417 |
| 6,079,736 A * | 6/2000 | Koide | B60R 21/2035 | 280/728.2 |
| 6,119,545 A * | 9/2000 | Hosoi | B60Q 5/003 | 280/731 |
| 6,517,113 B1 * | 2/2003 | Nicot | B62D 1/10 | 280/771 |
| 6,663,142 B2 * | 12/2003 | Terao | B60R 21/2037 | 280/728.2 |
| 7,104,156 B2 * | 9/2006 | Affleck | B62D 1/10 | 74/552 |
| 8,127,446 B2 * | 3/2012 | LaBoskey | B21D 53/26 | 29/428 |
| 8,505,410 B2 * | 8/2013 | Matsu | B62D 1/11 | 280/731 |
| 9,415,791 B1 * | 8/2016 | Dean | B62D 7/222 | |
| 9,988,003 B2 * | 6/2018 | Moinard | B60R 16/027 | |
| 2001/0011814 A1 | 8/2001 | Terao et al. | | |
| 2005/0097982 A1 * | 5/2005 | Li | B60R 25/0222 | 74/552 |
| 2006/0213314 A1 * | 9/2006 | Bostick | B62D 1/08 | 74/552 |
| 2008/0257103 A1 * | 10/2008 | Greppi | B62D 1/04 | 74/557 |
| 2011/0226088 A1 * | 9/2011 | Muller | B62D 1/08 | 74/552 |
| 2016/0083002 A1 * | 3/2016 | Lin | B62D 1/06 | 74/554 |
| 2016/0129860 A1 * | 5/2016 | Moinard | B62D 1/04 | 74/552 |
| 2016/0325662 A1 * | 11/2016 | Nash | B60N 3/005 | |
| 2017/0349202 A1 * | 12/2017 | Banno | B62D 1/04 | |

\* cited by examiner

VEHICLE STEERING WHEEL

BACKGROUND OF THE INVENTION

1. Field of the Invention

The present invention relates to a vehicle steering wheel.

2. Description of the Related Art

There are known vehicle steering wheels that, when a load is applied thereto by a second collision, lessen the impact by deforming at fragile portions formed in a core metal member thereof (see, for example, Japanese Patent Application Publication No. 2001-171526).

There are also known three-spoke steering wheels which have three spoke parts, with no core metal member provided for the spoke part that extends downward straight from the boss part with the steering wheel in neutral position (see, for example, Japanese Patent Application Publication No. 2014-94727).

Conventionally, the same core metal member is not usable for a two-spoke steering wheel with two spoke parts and a three-spoke steering wheel with three spoke parts.

Furthermore, a three-spoke steering wheel has higher rigidity for supporting the rim part than a two-spoke steering wheel does because the three-spoke steering wheel has one more spoke part than the two-spoke steering wheel. Accordingly, protection provided to the driver coming into contact with a steering wheel differs depending on whether the steering wheel is a three-spoke steering wheel or a two-spoke steering wheel.

SUMMARY OF THE INVENTION

The present invention has been made to solve the above problems and aims to provide a vehicle steering wheel formed from a core metal member which is easily changeable in the number of spokes and provides the same level of driver protection irrespective of the number of the spokes in the vehicle steering wheel.

An aspect of the present invention is a vehicle steering wheel comprising: a boss part attached to a steering shaft; a rim part provided around the boss part; a plurality of spoke parts joining to the boss part and the rim part to each other; and a core metal member shared by the boss part, the spoke parts, and the rim parts. At least one of the spoke parts is separable from the core metal member so that the core metal member is usable to obtain any of a many-spoke steering wheel having the plurality of spoke parts and a few-spoke steering wheel having fewer spoke parts than the many-spoke steering wheel, and a part of the core metal member corresponding to the at least one of the spoke parts is provided with a separation mark indicating a portion along which to separate the spoke part.

In the thus-configured vehicle steering wheel of the present invention, an unnecessary spoke part can be separated from the core metal member by a cut along the separation mark on the core metal member, with a necessary spoke part unseparated from the core metal member. The number of the spoke parts can thus be adjusted easily.

A part of the core metal member forming one of the spoke parts which extends downward straight from the boss part with the steering wheel in neutral position is provided with the separation mark, at a boss-part joint portion of the spoke part joined to the boss part.

According to this configuration, the spoke part extending downward straight from the boss part can be easily separated using the separation mark provided in the boss-part joint portion joined to the boss part.

The separation mark also acts as a fragile portion.

According to this configuration, the vehicle steering wheel having the spoke part unseparated can be decreased in strength.

A part of the core metal member forming one of the spoke parts which extends downward straight from the boss part with the steering wheel in neutral position is provided with the separation mark, at a rim-part joint portion of the spoke part joined to the rim part.

According to this configuration, the separation of the spoke part is facilitated, and also, the vehicle steering wheel having the spoke part unseparated can be decreased in strength.

The separation mark is formed in an indented manner to form a bottom portion which has a smaller plate thickness than its adjacent portions.

According to this configuration, the spoke part can be easily bent and deformed at the area with the separation mark. The indented separation mark is easily workable and visible in the manufacture of the steering wheel.

The vehicle steering wheel comprises a plurality of the fragile portions, and different plate thicknesses are set to the bottom portions of the respective fragile portions to adjust strength of the vehicle steering wheel.

According to this configuration, adjustment in the deformation level can be achieved by setting a smaller thickness to the part for which a larger displacement is wanted.

The part of the core metal member forming the spoke part extending downward straight from the boss part has paired vertical spokes whose interval is largest at the boss part and decreases towards the rim part.

According to this configuration, the vertical spokes are connected to the rim part at one location. By having less area connected to the vertical spokes, the rim part is decreased in strength and is more deformable.

Another aspect of the present invention is a vehicle-steering-wheel core metal member usable in any of a many-spoke steering wheel which has a plurality of spoke parts and a few-spoke steering wheel which has fewer spoke parts than the many-spoke steering wheel, and a part of the core metal member forming at least one of the plurality of spoke parts is provided with a separation mark.

According to this configuration, a many-spoke steering wheel and a few-spoke steering wheel having different numbers of spoke parts can be selectively obtained from a core metal member by or not by separating a spoke part from the core metal member along the separation mark.

The present invention provides a vehicle steering wheel formed from a core metal member which is easily changeable in the number of spokes and provides the same level of driver protection irrespective of the number of the spokes in the vehicle steering wheel.

DETAILED DESCRIPTION OF THE EMBODIMENTS

An embodiment of the present invention will be hereinafter described in detail with reference to the accompanying drawings.
[Schematic Configuration of a Vehicle Steering Wheel]

Figure 1:
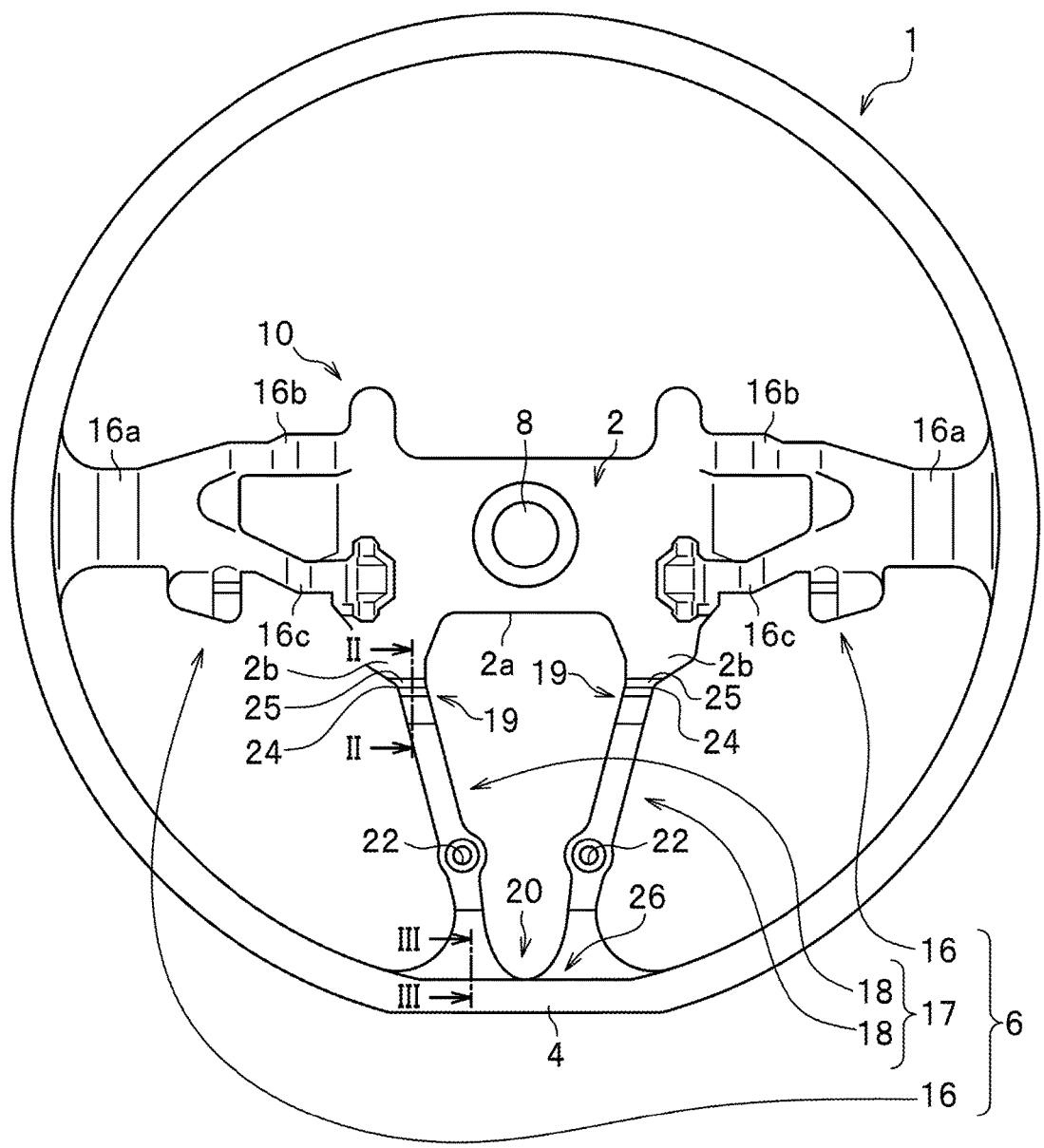
FIG. 1 is a front view of a vehicle steering wheel according to an embodiment of the present invention, with its cover removed to reveal a rim part, spoke parts, and a boss part.

FIG. 1 is a front view of a vehicle steering wheel 1 according to the embodiment, with its resin cover (not shown) removed to reveal a boss part 2, a rim part 4, and spoke parts 6. The vehicle steering wheel 1 of the embodiment includes a metallic core metal member 10 shared by the boss part 2, the rim part 4, and the spoke parts 6.

In the vehicle steering wheel 1 of the embodiment, the boss part 2, which is plate-shaped and formed by the core metal member 10, is attached to a steering shaft 8. The boss part 2 of the embodiment substantially has a letter H shape in a front view and has spoke attachment portions 2b, 2b respectively protruding from left and right ends of a lower edge portion 2a thereof.

The annular rim part 4 is provided around the boss part 2 of the core metal member 10.

The boss part 2 and the rim part 4 are integral with each other, joined by the spoke parts 6.

The spoke parts 6 are, specifically, paired horizontal spoke parts 16, 16 extending in the vehicle width direction, one to the right and the other to the left, with the steering wheel 1 in neutral position, and a single separable spoke part 17 extending downward straight from the boss part 2 with the steering wheel 1 in neutral position.

Each of the horizontal spoke parts 16 of the embodiment has an outer spoke part 16a connected to the rim part 4 and paired upper and lower inner spoke parts 16b, 16c connected to the boss part 2.

The separable spoke part 17 of the embodiment has paired vertical spokes 18, 18 each provided as a part of the core metal member 10 to make the core metal member 10 partially separable.

Close to the boss part 2, these vertical spokes 18, 18 are spaced a certain interval apart in the vehicle width direction, and connected to the boss part 2 with their upper ends, namely boss-part joint portions 19, 19, joined to the spoke attachment portions 2b, 2b, respectively.

The interval between the vertical spokes 18, 18 decreases towards the rim part 4. Then, the left and right vertical spokes 18, 18 meet and connect at a rim-part joint portion 20 located at their lower end portions and in the center of the steering wheel 1 in the vehicle width direction, substantially forming a letter V shape in a front view.

The rim-part joint portion 20 is connected to the inner periphery of the rim part 4. The separable spoke part 17 thereby supports the rim part 4 at one location.

Figure 2:
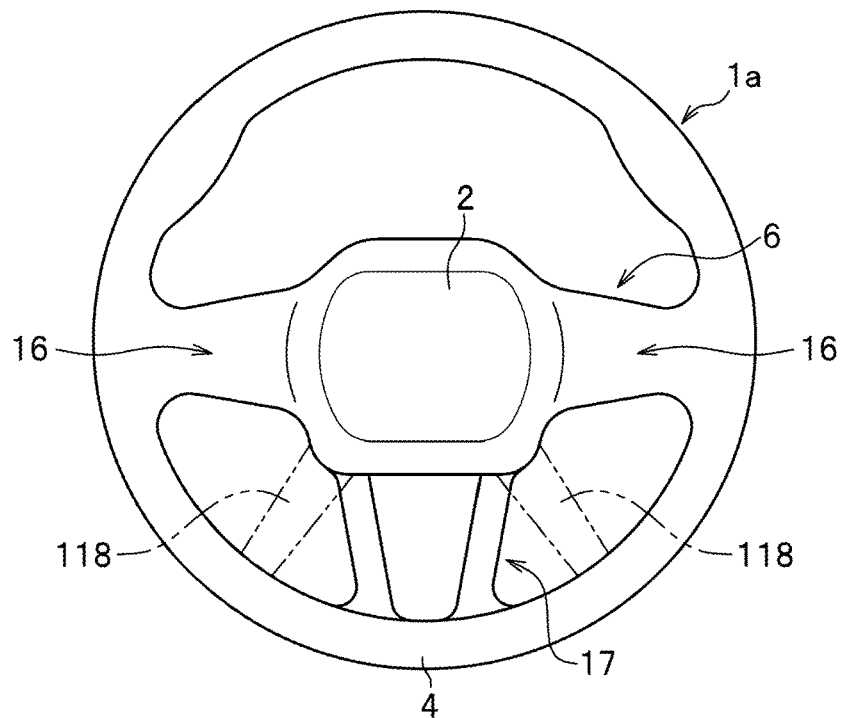
FIG. 2 is a front view of the vehicle steering wheel according to the embodiment of the present invention as a three-spoke steering wheel with three spoke parts.

FIG. 2 is a front view of the vehicle steering wheel according to the embodiment of the present invention, as a three-spoke steering wheel 1a with three spoke parts 6 (a many-spoke vehicle steering wheel).

The core metal member 10 can be selectively used for any one of the three-spoke steering wheel 1a or a two-spoke steering wheel 1b having one fewer spoke part 6 than the three-spoke steering wheel 1a.

In this embodiment, the vertical spokes 18, 18 of the separable spoke part 17 in the three-spoke steering wheel 1a shown in FIG. 2 are separable from the core metal member 10 (see FIG. 1).

Each vertical spoke 18 is provided with a cover attachment portion 22 (see FIG. 1). A part of the resin cover (not shown), a garnish, is attached to the cover attachment portion 22. In the two-spoke steering wheel 1b without the separable spoke part 17, no garnish is attached to the part otherwise having the separable spoke part.

Figure 3:
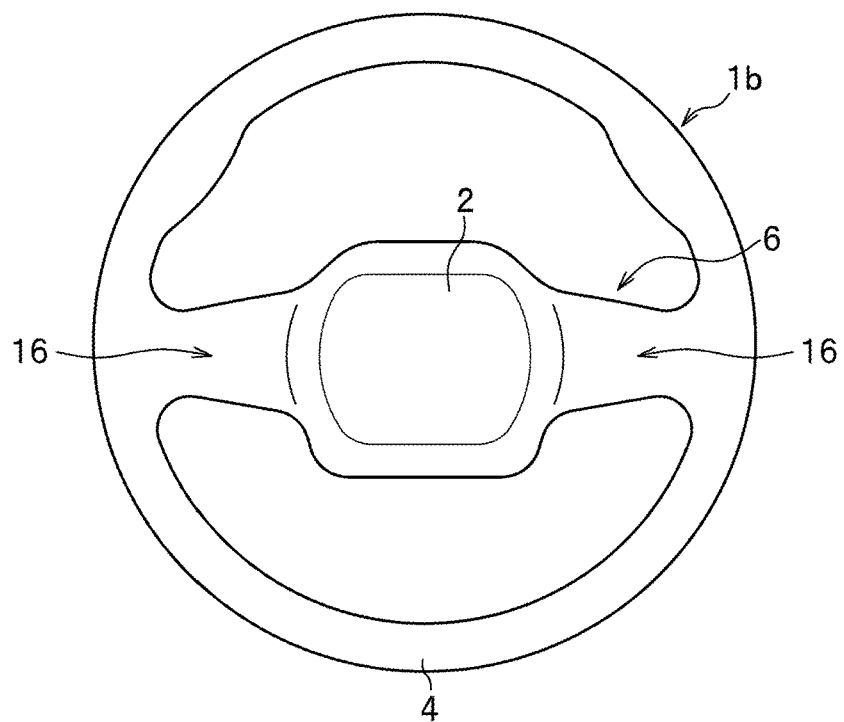
FIG. 3 is a front view of the vehicle steering wheel according to the embodiment of the present invention as a two-spoke steering wheel with two spoke parts.

FIG. 3 is a front view of the vehicle steering wheel according to the embodiment of the present invention, as the two-spoke steering wheel 1b with two spoke parts 6 (a few-spoke steering wheel).

In this embodiment, the vertical spokes 18, 18 constituting the separable spoke part 17 as shown in FIG. 1 are separated from the core metal member 10 (see FIG. 1).

The core metal member 10 is thus used for the two-spoke steering wheel 1b shown in FIG. 3, with the rim part 4 supported only by the horizontal spoke parts 16, 16.

Figure 4:
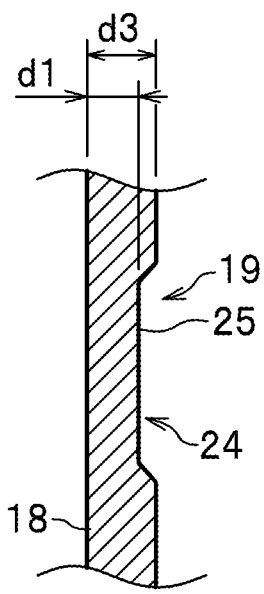
FIG. 4 is a sectional view of the vehicle steering wheel according to the embodiment of the present invention, taken along line II-II in FIG. 1 to show the sectional shape of a spoke part.

FIG. 4 is a sectional view of the vehicle steering wheel 1 according to the embodiment of the present invention, taken along line II-II in FIG. 1 to show the sectional shape of one of the vertical spokes 18, 18 in an upper portion of the separable spoke part 17.

Each vertical spoke 18 has a first fragile portion 24 formed in the boss-part joint portion 19 as a separation mark indicating the separable area. To act as a separation mark, the first fragile portion 24 has an indentation on its side surface on the vehicle rear side and is thereby reduced in plate thickness to form a bottom portion 25. Steps are accordingly formed in the side surface between the bottom portion 25 and its adjacent areas.

Figure 5:
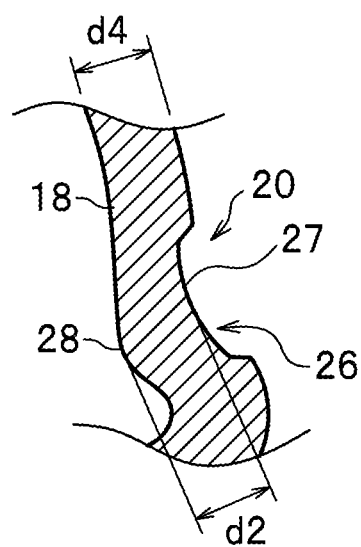
FIG. 5 is a sectional view of the vehicle steering wheel according to the embodiment of the present invention, taken along line in FIG. 1 to show the sectional shape of the spoke part.

FIG. 5 is a sectional view of the vehicle steering wheel 1 according to the embodiment of the present invention, taken along line in FIG. 1 to show the sectional shape of the vertical spoke 18 in a lower part of the separable spoke part 17.

The vertical spoke 18 has a second fragile portion 26 formed in the rim-part joint portion 20. One of the roles of the second fragile portion 26 is to serve as a separation mark. To act as a separation mark, the second fragile portion 26 has an indentation on its side surface on the vehicle rear side and is thereby reduced in plate thickness to form a bottom portion 27. Steps are accordingly formed in the side surface between the bottom portion 27 and its adjacent areas, as in the case of the first fragile portion 24.

A side surface 28 of the second fragile portion 26 on the opposite side from the aforementioned side surface projects to the vehicle front side. In this embodiment, the side surface 28 projects with a curving profile, increasing the plate thickness of the bottom portion 27. The plate thickness of the bottom portion 27 is different from that of the bottom portion 25 so that the rim-part joint portion 20 may be stronger than the boss-part joint portions 19, 19.

The side surface of the second fragile portion 26 on the vehicle rear side is indented to have the steps adjacent to the bottom portion 27, acting as a separation mark.

The first fragile portion 24 and the second fragile portion 26 serve as marks for use in separating the separable spoke part 17 from the core metal member 10 when the two-spoke steering wheel 1b without the separable spoke part 17 (see FIG. 3) is to be manufactured.

When the three-spoke steering wheel 1a with three spoke parts 6 (see FIG. 2) is to be manufactured, the separable spoke part 17 is not separated.

Assume that a load is applied to the three-spoke steering wheel 1a from the rear of the vehicle by the driver coming into contact with the rim part 4 as, for example, a second collision, which is a collision of a driver with a vehicle steering wheel after a vehicle crash. In this event, the first fragile portion 24 and the second fragile portion 26 bend and deform more greatly than the other areas.

In this embodiment, as shown in FIGS. 4 and 5, plate thickness d1 of the bottom portion 25 of the first fragile portion 24 is smaller than plate thickness d2 of the bottom portion 27 of the second fragile portion 26 (d1<d2).

In this embodiment, the plate thickness d2 of the bottom portion 27 of the second fragile portion 26, where the side surface 28 on the vehicle front side protrudes in a curving profile with its vertex being in the almost center of the bottom portion 27, is larger than the plate thickness d1 of the bottom portion 25 of the first fragile portion 24 (d2>d1).

The plate thickness d1 of the bottom portion 25 of the first fragile portion 24 is smaller than plate thickness d3 of its adjacent areas of the vertical spoke 18 (d1<d3), and the plate thickness d2 of the bottom portion 27 of the second fragile portion 26 is smaller than plate thickness d4 of its adjacent areas of the vertical spoke 18 (d2<d4).

In the second fragile portion 26, the plate thickness d2 of the bottom portion 27 in its center portion is increased by the portion on the side surface 28 bulging to the vehicle front side. Thus, the plate thickness d2, which is along the direction in which a load is applied, is effectively increased, improving the rigidity for supporting the rim part 4. The second fragile portion 26 of this embodiment is thin except for the center area of the bottom portion 27. The second fragile portion 26 is therefore more easily separable and relatively deformable than the first fragile portion 24.

When a force for bending the vertical spoke 18 is applied to the vertical spoke 18 from the rim-part joint portion 20 joined to the rim part 4, the force is transmitted to the upper part of the vertical spoke 18 as a force to bend and deform the first fragile portion 24.

Figure 6A:
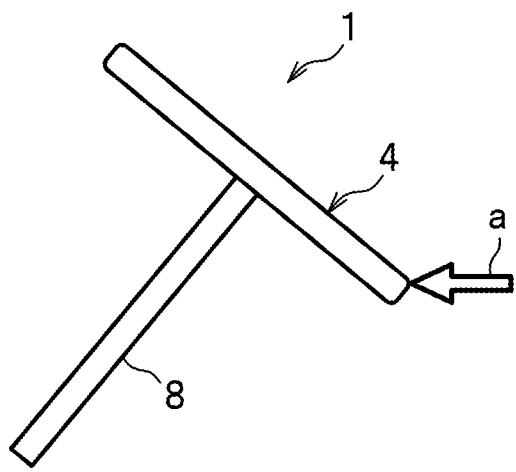
FIGS. 6A and 6B are side views of the vehicle steering wheel according to the embodiment of the present invention before and after a collision, respectively.
Figure 6B:
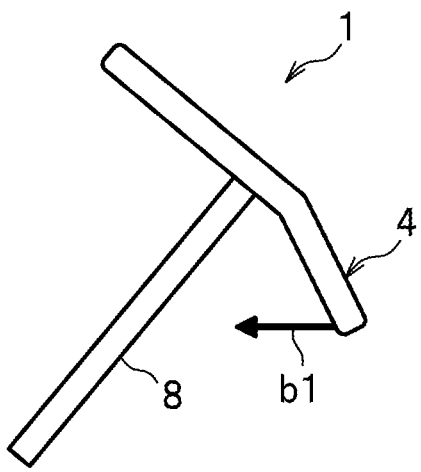

FIGS. 6A and 6B are schematic side views of the vehicle steering wheel 1 according to the embodiment of the present invention before and after a collision, respectively.

For example, if a load a is applied to a lower part of the rim part 4 by a second collision as shown in FIG. 6A, the vehicle steering wheel 1 bends at the bottom portion 25 of the first fragile portion 24, displacing the rim part 4 vertically to the vehicle front side at its portion under the steering shaft 8, as shown in FIG. 6B.

The vehicle steering wheel 1 thus has a large displacement b1 to the vehicle front side. The three-spoke steering wheel 1a with the separable spoke part 17 unseparated is therefore obtained without a decrease in its protection for the driver coming into contact with the vehicle steering wheel 1.

Figure 7A:
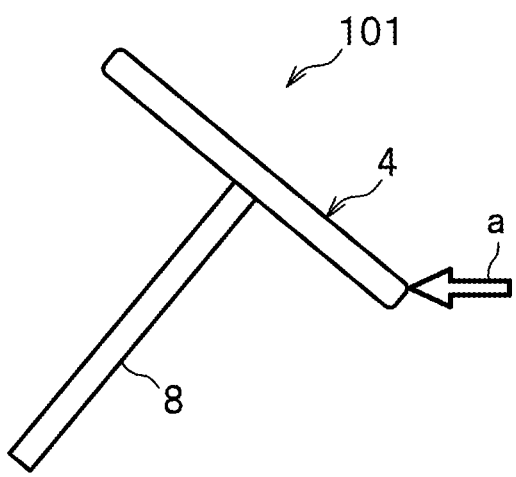
FIGS. 7A and 7B are side views of a vehicle steering wheel of a comparative example before and after a collision, respectively.
Figure 7B:
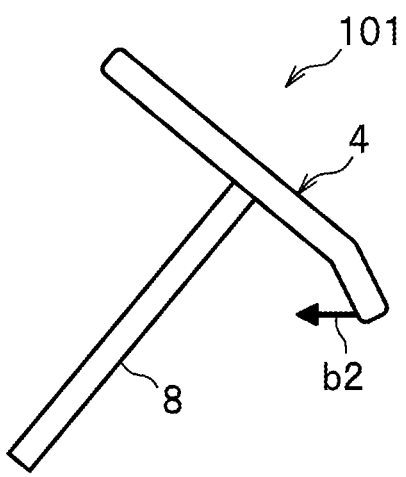

FIGS. 7A and 7B are schematic side views of a vehicle steering wheel 101 of a comparative example before and after a collision, respectively. The vehicle steering wheel 101 of this comparative example is either provided with a fragile portion only in a lower part of the separable spoke part or provided with no fragile portion in the separable spoke part.

If the load a is applied to a lower part of the rim part 4 by a second collision as shown in FIG. 7A, the vehicle steering wheel 101 bends only in the very lower part of the rim part 4, deforming by a displacement b2, as shown in FIG. 7B.

Since the vehicle steering wheel 101 of the comparative example obtains the displacement b2 to the vehicle front side by bending only in the very lower part of the rim part 4, it is difficult to set a large value as the displacement b2 for absorbing the applied load.

In comparison, the displacement b1 to the vehicle front side of the vehicle steering wheel 1 of the embodiment is larger than the displacement b2 of the vehicle steering wheel 101 of the comparative example (b1>b2) because the rim part 4 deforms to the vehicle front side by bending vertically at its portion under the steering shaft 8.

Advantageous effects of the vehicle steering wheel of this embodiment are described next.

In the core metal member 10 of the vehicle steering wheel 1 according to the embodiment of the present invention, the vertical spokes 18, 18 constituting the separable spoke part 17 each have the indented first fragile portion 24 and the indented second fragile portion 26. The first fragile portion 24 and the second fragile portion 26 serve as separation marks at the upper and lower end portions of the vertical spoke 18, respectively.

The steps formed between the thin bottom portion 25, 27 and its adjacent areas make the position of the separation mark noticeable and are therefore helpful in separating the unnecessary vertical spokes 18, 18.

It is therefore easy to separate an unnecessary spoke part from the core metal member 10 along the separation marks, with necessary spoke parts unseparated.

In this embodiment, the core metal member 10 can be used for the two-spoke steering wheel 1b when the horizontal spoke parts 16 are left unseparated and the vertical spokes 18, 18 constituting the separable spoke part 17 are separated along the separation marks.

Since the bottom portion 25 and the bottom portion 27 of the embodiment are thinner and easier to work than other portions of the vertical spoke 18, the vertical spoke 18 can be separated along the separation marks on the core metal member 10 at accurate positions.

Since the number of the spoke parts 6 in the core metal member 10 can be easily adjusted, the core metal member 10 can be used selectively for any of the three-spoke steering wheel 1a with the separable spoke part 17 shown in FIG. 2 and the two-spoke steering wheel 1b without the separable spoke part 17 shown in FIG. 3, achieving component commonality.

In the vehicle steering wheel 1 of the embodiment, the separation marks on each vertical spoke 18 act also as the first fragile portion 24 and the second fragile portion 26 and facilitate the separation of the vertical spoke 18 at the thin bottom portion 25 and bottom portion 27, eliminating the need for additional separation marks, such as markings, besides the first fragile portion 24 and the second fragile portion 26.

When the separable spoke part 17 is left unseparated as shown in FIG. 2, the indented first fragile portions 24 remain in the boss-part joint portions 19, 19 located at the upper end portions of the vertical spokes 18, 18, while the indented second fragile portion 26 remains in the rim-part joint portion 20 located at the lower end portions of the vertical spokes 18, 18, as shown in FIG. 1.

Since the first fragile portion 24 has the thin bottom portion 25 and bends more easily than the other part of the vertical spoke 18, the vertical spoke 18 bends at the bottom portion 25 of the first fragile portion 24 as shown in FIG. 6, allowing the rim part 4 to deform vertically to the vehicle front side at its portion under the steering shaft 8.

The vehicle steering wheel 1 of the embodiment therefore achieves the large displacement b1 to the vehicle front side, improving the performance for protecting the driver coming into contact with the vehicle steering wheel 1.

Provided with the indented first fragile portion 24, the three-spoke steering wheel 1a can approximate its strength against a second collision to that of the two-spoke steering wheel 1b.

Whether the three-spoke steering wheel 1a is selected or the two-spoke steering wheel 1b is selected, their driver protection performances are on the same level.

Since the separation marks act also as the first fragile portion 24 and the second fragile portion 26 in the core metal member 10 used in the vehicle steering wheel 1 of the embodiment, different types of vehicle steering wheels having different numbers of spoke parts 6 (the three-spoke steering wheel 1a or the two-spoke steering wheel 1b) can be provided without an increase in the number of components.

In the core metal member 10, the second fragile portion 26 to serve as a separation mark is provided in the rim-part joint portion 20 joined to the rim part 4. Thus, the second fragile portion 26, together with the first fragile portion 24, act as a mark indicating the location to cut when the vertical spoke 18 is to be separated, facilitating the separation of the vertical spoke 18.

To manufacture the three-spoke steering wheel 1a having the vertical spokes 18, 18 unseparated (see FIG. 2), its strength can be appropriately adjusted and decreased by the plate thickness d2 of the bottom portion 27 of the second fragile portion 26.

In this embodiment, as shown in FIG. 5, the indented bottom portion 27 is formed in the second fragile portion 26 with its plate thickness d2 smaller than the plate thickness d4 of its adjacent areas (d2<d4).

Thus, in the three-spoke steering wheel 1a having the vertical spokes 18, 18 unseparated, the vertical spokes 18, 18 is easily bendable and deformable at the separation mark areas.

The indented separation marks can be formed easily, and as in the case of the first fragile portion 24 of the boss-part joint portions 19, 19, the plate thickness d2 can be adjusted when the indentation is formed in manufacturing of the core metal member 10.

As shown in FIG. 5, the bottom portion 27 of the second fragile portion 26 of the embodiment has the opposite side surface 28 protruding to the vehicle front side. In other words, the side surface 28 protrudes with a curving profile, increasing the plate thickness d2 of the bottom portion 27.

As can be seen from the comparison between FIGS. 4 and 5, different thicknesses, d1 and d2, are set for the bottom portion 25 and the bottom portion 27, respectively, to make the strength of the rim-part joint portion 20 larger than that of the boss-part joint portions 19, 19.

Thus, in the vertical spoke 18, the second fragile portion 26 is more rigid and less deformable than the first fragile portion 24.

Thus, the lower part of the rim part 4 deforms to the vehicle front side at the first fragile portions 24 of the boss-part joint portions 19, 19, which are close to the steering shaft 8 and relatively deformable, and a desired displacement b1 can be achieved (see FIG. 6).

The deformation level can be changed through adjustment of the thicknesses of the indented bottom portions 25, 27 acting as separation marks, according to whether small or large deformations are to be achieved.

Since the side surface 28 of the second fragile portion 26 of the embodiment, for example, is formed into a curving profile, the rim part 4 can efficiently receive the load a applied to the lower part thereof upon a second collision, as shown in FIG. 6A.

This helps a force be applied to the upper first fragile portion 24 of the vertical spoke 18 in an effective bending direction.

In this embodiment, close to the boss part 2, the paired vertical spokes 18, 18 are spaced apart in the vehicle width direction, substantially forming a letter V shape.

Such an arrangement of the vertical spokes 18, 18 makes it further likely for the rim part 4 to deform at the first fragile portions 24, 24 of the boss-part joint portions 19, 19, which are close to the steering shaft 8.

The vertical spokes 18, 18 of the embodiment meet and connect at the rim-part joint portion 20 located at their lower end portions in the center of the steering wheel 1 in the vehicle width direction, and are therefore integral with the rim part 4 of the core metal member 10 at one location. This allows the other part of the rim part 4 to bow, offering improved protection for the driver coming into contact with the vehicle steering wheel 1.

If the vehicle steering wheel 1 had, for example, paired vertical spokes 118, 118 which form an inverted, broken letter V shape as indicated by the alternate long and two short dashes lines in FIG. 2, forming two joint portions to the rim part 4, the rim part 4 would be hard to bow.

In contrast, the vertical spokes 18, 18 of the vehicle steering wheel 1 of the embodiment are supported at the rim part 4 at a single location via the rim-part joint portion 20, having less area that is relatively unlikely to bow.

This enables improvement in the protection for the driver coming into contact with the rim part 4.

In the vehicle steering wheel 1 of the embodiment, the separable spoke part 17, among the multiple spoke parts, is separated using the separation marks on the core metal member 10. This way, any of the three-spoke steering wheel 1a and the two-spoke steering wheel 1b having different numbers of spoke parts 6 can be selectively obtained.

The indented, thin bottom portion 25 is formed to create steps to act as the separation marks and also as the first fragile portion 24. The separation marks can be formed at desired positions on the vertical spoke 18.

Accordingly, the core metal member 10 has high workability and is easily adjustable in its strength. Thus, even if the vehicle steering wheels 1 having different numbers of spokes are manufactured from the same core metal member 10, their driver protection performances are on the same level.

The present invention is not limited to the embodiment described above, and can be variously modified. The above embodiment has been provided as an example only to facilitate the understanding of the present invention, and is not intended to mean that the present invention has to include all the configurations described therein. Configurations in a certain embodiment may be partly replaced by configurations in a different embodiment, and a configuration in a certain embodiment may be added to a configuration in a different embodiment. Configurations in one embodiment may be omitted or replaced partly, or may be provided with an additional configuration. The following describe possible modifications of the embodiment.

The vehicle steering wheel of the above embodiment has the paired separable vertical spokes 18, 18 in the part of the core metal member 10 corresponding to the separable spoke part 17. The present invention is not limited to this. The separable spoke part 17 may be formed by one, three, or more separable vertical spokes 18. The shapes, the number, and the material of the spokes constituting the separable spoke part 17 are not limited as long as they have separation marks on them.

In the embodiment herein, the paired left and right vertical spokes 18, 18 are spaced apart close to the boss part 2 and have their interval decreasing towards the rim part 4. The present invention is however not limited to this. The vertical spokes 18, 18 may be parallel to each other or form an inverted letter V shape.

The vertical spokes 18, 18 may form an inverted and broken letter V shape to be connected to the rim part 4 at two locations or form a broken letter V shape to be connected to the boss part 2 at two locations. The spokes may have an arc shape. If a vehicle steering wheel has, for example, paired spokes whose interval increases or decreases towards the rim part, the spokes may have symmetrical arc shapes.

Although the three-spoke steering wheel 1a has been used as an example of a many-spoke steering wheel, the number of the spokes is not limited, and the present invention is applicable to a steering wheel having, for example, four or more spoke parts.

Although the two-spoke steering wheel 1b has been used as an example of a few-spoke steering wheel having one fewer spoke part than the many-spoke steering wheel, the present invention is not limited to this. The few-spoke steering wheel may have two or more fewer spoke parts. The few-spoke steering wheel only has to have at least one fewer spoke part than the many-spoke steering wheel so that the core metal member 10 usable to manufacture the many-spoke steering wheel can be used to manufacture the few-spoke steering wheel.

Although the separation marks are formed in an indented manner to also act as the first fragile portion 24 and the second fragile portion 26, the present invention is not limited to this. The separation marks may be, for example, punched or painted marks.

What is claimed is:

1. A vehicle steering wheel comprising:
   a boss part attached to a steering shaft;
   a rim part provided around the boss part;
   a plurality of spoke parts joining the boss part and the rim part to each other; and
   a core metal member shared by the boss part, the spoke parts, and the rim parts,
   wherein
   at least one of the spoke parts is separable from the core metal member so that the core metal member is usable to obtain any of a many-spoke steering wheel having the plurality of spoke parts and a few-spoke steering wheel having fewer spoke parts than the many-spoke steering wheel,
   a part of the core metal member corresponding to the at least one of the spoke parts is provided with a separation mark indicating a portion along which to separate the spoke part, and
   a part of the core metal member forming one of the spoke parts which extends straight downward from the boss part with the steering wheel in neutral position is provided with the separation mark at a rim-part joint portion of the spoke part joined to the rim part, the separation mark provided at the rim-part joint portion of the spoke part being formed in an indented manner to form a bottom portion which has a smaller plate thickness than portions of the rim-part joint portion adjacent to the bottom portion.

2. A vehicle steering wheel according to claim 1, wherein
   the part of the core metal member forming the one of the spoke parts which extends downward straight from the boss part with the steering wheel in neutral position is provided with a second separation mark, at a boss-part joint portion of the spoke part joined to the boss part.

3. The vehicle steering wheel according to claim 2, wherein
   the part of the core metal member forming the spoke part extending downward straight from the boss part has paired vertical spokes whose interval is largest at the boss part and decreases towards the rim part.

4. The vehicle steering wheel according to claim 1, wherein
   the separation mark also acts as a fragile portion.

5. The vehicle steering wheel according to claim 4, comprising:
   a plurality of the separation mark, each of which act as a fragile portion, wherein
   different plate thicknesses are set to the bottom portions of the respective fragile portions to adjust strength of the vehicle steering wheel.

6. A vehicle-steering-wheel core metal member usable in any of a many-spoke steering wheel which has a plurality of spoke parts and a few-spoke steering wheel which has fewer spoke parts than the many-spoke steering wheel, wherein
   a part of the core metal member forming at least one of the plurality of spoke parts is provided with a separation mark at a rim-part joint portion of the spoke part joined to a rim part of the core metal member, the separation mark provided at the rim-part joint portion of the spoke part being formed in an indented manner to form a bottom portion which has a smaller plate thickness than portions of the rim-part joint portion adjacent to the bottom portion.

* * * * *